(12) United States Patent
Kump

(10) Patent No.: US 7,142,735 B2
(45) Date of Patent: Nov. 28, 2006

(54) ACOUSTO-OPTIC TUNABLE FILTER CONTROLLER

(75) Inventor: John Kump, Hillsborough, CA (US)

(73) Assignee: Crystal Technology, Inc., Palo Alto, CA (US)

( * ) Notice: Subject to any disclaimer, the term of this patent is extended or adjusted under 35 U.S.C. 154(b) by 0 days.

(21) Appl. No.: 11/112,528

(22) Filed: Apr. 22, 2005

(65) Prior Publication Data

US 2005/0238276 A1    Oct. 27, 2005

Related U.S. Application Data

(60) Provisional application No. 60/564,891, filed on Apr. 22, 2004, provisional application No. 60/585,248, filed on Jul. 1, 2004.

(51) Int. Cl.
*G02F 1/335*    (2006.01)
*H04J 14/00*    (2006.01)

(52) U.S. Cl. .......................... 385/7; 398/85
(58) Field of Classification Search .............. None
See application file for complete search history.

(56) References Cited

U.S. PATENT DOCUMENTS

| | | | |
|---|---|---|---|
| 5,039,855 A | 8/1991 | Kemeny et al. | 250/339 |
| 5,504,827 A | 4/1996 | Schimpe | |
| 5,541,413 A | 7/1996 | Pearson et al. | |
| 6,424,451 B1 | 7/2002 | Chang | |
| 6,532,323 B1 | 3/2003 | Kim et al. | |
| 6,549,328 B1 | 4/2003 | Aoki et al. | |
| 2004/0190904 A1* | 9/2004 | Noguchi et al. | 398/85 |
| 2005/0169633 A1* | 8/2005 | Nakagawa et al. | 398/85 |

* cited by examiner

*Primary Examiner*—Michelle Connelly-Cushwa
(74) *Attorney, Agent, or Firm*—David H. Jaffer; Pillsbury Winthrop Shaw Pittman LLP

(57) ABSTRACT

AOTF controller that monitors output power of a plurality of wavelengths of an AOTF and scans the frequency of corresponding RF input signals to an AOTF acoustic transducer and searches for the RF frequency corresponding to each desired wavelength that provides maximum optical output for each wavelength. The controller includes a plurality of sensor inputs for monitoring the power of each wavelength output from the AOTF, and alternatively, also monitors other AOTF parameters such as temperature and/or reads AOTF identification performance data that can be stored in a EPROM on a AOTF housing. The controller includes facility for input of modulation data, and in response to the data modulates the corresponding wavelength parameter such as power. A USB bus is provided for input of programming to the controller, and for output of performance data from the controller.

18 Claims, 6 Drawing Sheets

ACOUSTO-OPTIC TUNABLE FILTER CONTROLLER

This application claims the benefit of U.S. Provisional Application Ser. No. 60/564,891 filed Apr. 22, 2004, and U.S. Provisional Application Ser. No. 60/585,248 filed Jul. 1, 2004.

BACKGROUND OF THE INVENTION

1. Field of Invention

The present invention relates generally to control circuitry for optic filters, and more specifically to a control circuit for an acousto-optic tunable filter that automatically optimizes filter control parameters.

2. Description of the Prior Art

An acousto-optic tunable filter (AOTF) is used to select particular light wavelengths from an incident beam. Wavelength selection is needed in many areas of technology, such as fluorescence spectroscopy, microscopy, and optical communication systems. In addition to wavelength selection, AOTFs provide a means for light modulation of either or both wavelength and amplitude. AOTF performance is sensitive to various parameters including environmental temperature, acoustic power applied and combinations of frequencies, which can alter the AOTF crystal material properties and cause drift of output intensity. Due to this sensitivity, an AOTF crystal may be placed in a temperature controlled environment, which only partially stabilizes the crystal performance.

SUMMARY

It is an object of the present invention to provide an improved AOTF controller.

It is a further object of the present invention to provide an AOTF controller that automatically optimizes a specific wavelength filter output.

It is a still further object of the present invention to provide an AOTF controller that can be programmed for a variety of control functions.

It is another object of the present invention to provide an AOTF controller that provides performance output data for display.

It is another object of the present invention to provide an AOTF controller that can respond to various parameters for optimizing AOTF output.

Briefly, a preferred embodiment of the present invention includes an AOTF controller that monitors output power of a plurality of wavelengths of an AOTF and scans the frequency of corresponding RF input signals to. an AOTF acoustic transducer and searches for the RF frequency corresponding to each desired wavelength that provides maximum optical output for each wavelength. The controller includes a plurality of sensor inputs for monitoring the power of each wavelength output from the AOTF, and alternatively, also monitors other AOTF parameters such as temperature and/or reads AOTF identification performance data that can be stored in a EPROM on a AOTF housing. The controller includes facility for input of modulation data, and in response to the data modulates the corresponding wavelength parameter such as power. A USB bus is provided for input of programming to the controller, and for output of performance data from the controller.

IN THE DRAWING

DETAILED DESCRIPTION OF THE PREFERRED EMBODIMENTS

Figure 1:
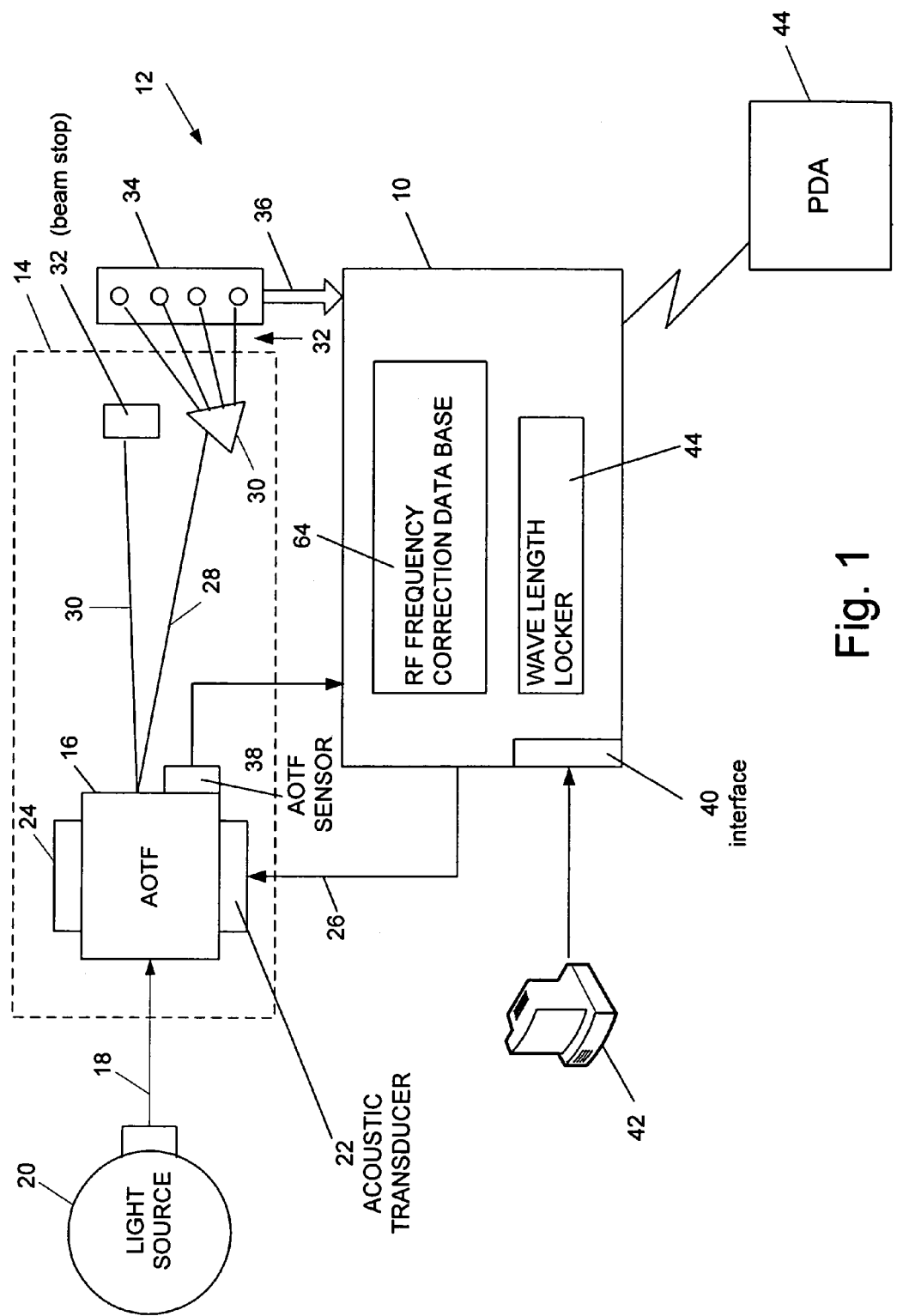
FIG. 1 illustrates an acousto-optic-tunable filter controller according to the present invention interconnected in a system.

Embodiments of the method and apparatus of the present invention will now be described in reference to FIG. 1 of the drawing. An acousto-optic-tunable filter controller (AOTF) 10 according to the present invention is shown in operation in a system 12 for controlling light output from an acousto-optic-tunable filter 14. A typical acousto-optic-tunable filter 14 includes an AOTF crystal 16 (e.g., a tellurium dioxide, quartz, and so on). An incident beam of light 18 (also referred to as an optical input signal) from a source 20 impinges on the AOTF crystal 16. A typical AOTF 14 further includes an acoustic transducer 22 bonded to one side of the AOTF crystal 16 and an acoustic absorber 24 bonded to the opposite side of the AOTF crystal 16. Acoustic waves are generated by the acoustic transducer 22 in response to an input RF signal 26. The frequency of the acoustic waves depend on the frequency of the applied RF signal, and the waves propagate through the AOTF crystal 16 and get absorbed in the acoustic absorber 24. The acoustic waves that propagate through the AOTF crystal 16 can generate a diffraction grating within the AOTF crystal such that a substantial portion of the incident beam of light 18 is diffracted. As a result, an output 28 of a typical acousto-optic-tunable filter includes a diffracted beam 28 that, for example, can be used as input to another optical device and an undiffracted beam 30 that is absorbed by a beam stop 32.

In addition, the diffracted beam 28 (also referred to as the optical output signal) is a "filtered" version of the incident beam 18. That is, the optical output signal 28 includes only a subset of wavelengths (i.e., "selected" wavelengths) that are present in the optical input signal 18.

Wavelength selection is controlled by the frequencies of the acoustic waves that are generated by the acoustic transducer 22 bonded to the AOTF crystal 16. That is, a selected wavelength of the optical output signal 28 depends on the acoustic frequency of an acoustic wave generated by the acoustic transducer 22. Moreover, the frequency of an acoustic wave generated by the acoustic transducer 22 is controlled by the control RF signal 26 supplied to the acoustic. transducer 22. That is, an acoustic frequency of an acoustic wave generated by the acoustic transducer 22 (which substantially determines a selected wavelength of the optical output signal 28) is substantially determined by the base RF frequency of the control RF signal 26 supplied to the acoustic transducer 22. Consequently, a selected wavelength of the optical output signal 28 is "tuned" by the base RF frequency of the control RF signal 26.

The output 28 contains a spectrum, which can be further separated by any known device for the purpose, such as a prism 30. The output wavelengths 32 are detected by a detector/sensor 34 which provides input 36 to the controller 10 of the present invention. The controller functions to provide what will be referred to as a wavelength locker 44 (FIG. 1), wherein a series of RF input scans are applied at 26 to the AOTF transducer 22, with each consecutive scan of reduced span. The controller responds to the resultant outputs 36, selecting the best frequency of each scan to determine the center of the next narrower scan to determine an optimum RF frequency (base frequency) 26 to drive the AOTF for achieving the desired AOTF output signals 32. This function will be more fully described in reference to FIG. 2.

Figure 3:
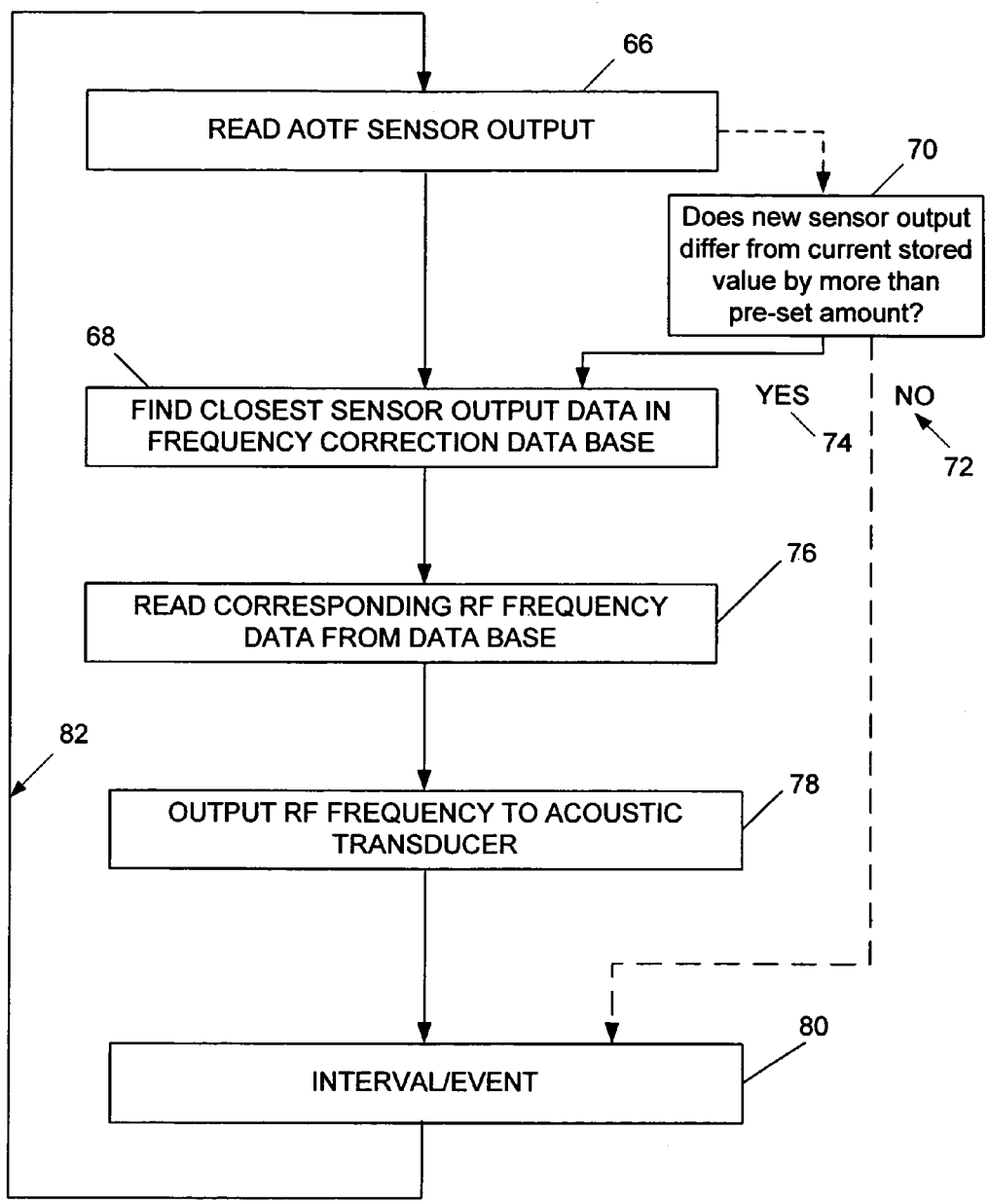
FIG. 3 is a flow chart illustrating the controller operating to correct wavelength variations due to environmental conditions.

According to a further embodiment of the present invention the controller 10 is configured to receive data from an AOTF sensor 38 for sensing a condition of the AOTF such as an AOTF temperature. The controller 10 is configured to respond to the sensor 38 output by adjusting the RF signal at 26 to provide an optimum output at 32. This operation will be fully described in reference to FIG. 3.

According to a still further embodiment of the present invention, the controller provides an interface 40 providing convenient communication apparatus to a computer 42, and alternatively or in addition to a personal digital assistant (PDA) 44. These and other features of the interface 40 will be fully described in reference to FIG. 4.

Figure 2:
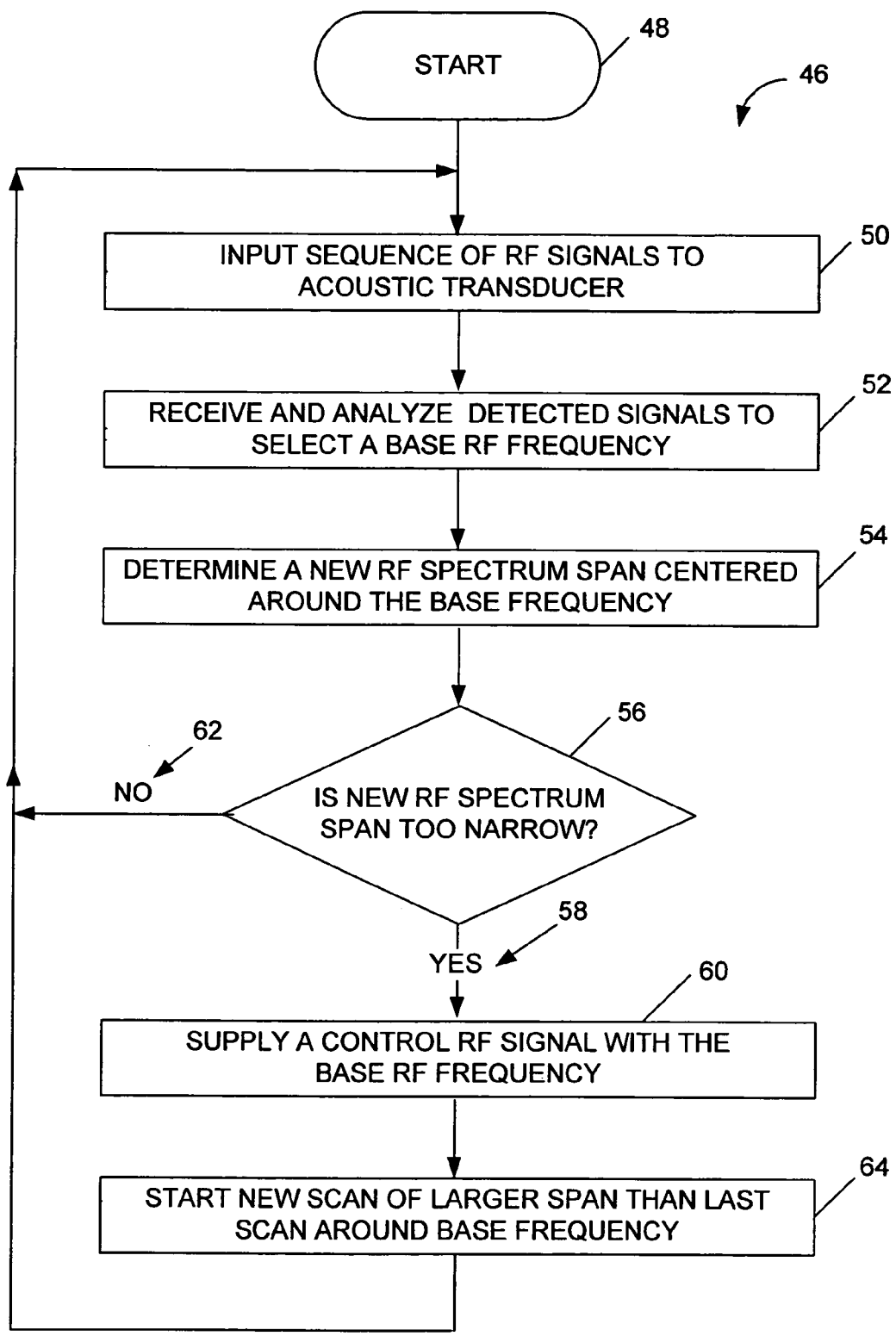
FIG. 2 is a flow chart for describing wavelength control as performed by the controller.

The wavelength locking feature will now be described in detail in reference to the flow chart of FIG. 2. The wavelength locker 44 determines a base RF frequency for the control RF signal 26 needed to substantially maintain an optical output signal at 32 at a desired wavelength. Referring to FIG. 2, the wavelength locking process 46 can be initiated (48) in a variety of ways. The process can be initiated by an end user (e.g., a technician) of the AOTF controller 10 through a user interface to the AOTF controller 10 (e.g., using the computer 42 connected to the AOTF controller 10 through a USB port, or through an RS232 port. Alternative, the AOTF controller 10 can be configured to initiate the process for determining the base RF frequency for the control RF signal at 26 at a predetermined time (e.g., on power up). Moreover, the AOTF controller 10 can be configured to initiate the process 46 at regular intervals.

Once the process 46 for determining the base RF frequency for the control RF signal 26 is initiated (48) in the wavelength locker 44, the wavelength locker 44 inputs (scans) a sequence of RF signals into the acoustic transducer 22 (block 50), and then receives an output detected signal 32 through bus 36 (block 52). The controller evaluates the detected data to determine which data is closest to the desired result, and then uses the corresponding applied RF signal as a new base RF frequency (block 52) for the next scan. The controller then determines a new sequence of RF frequencies centered around the new base frequency, wherein the new sequence is a reduced RF spectrum span from the preceding spectrum span (block 54). The controller then checks to determine if the new span is less than a pre-determined minimum (block 56). If it is less 58, then the base frequency of the new span is used to drive the acoustic transducer 22 (block 60). If the new span is greater than the minimum 62, then the process repeats wherein the new span/sequence is applied (block 50) and the resultant detected signals are analyzed (block 52), etc. This process will now be described in still more detail.

The scanning process of FIG. 2 includes repetitions of steps for automatically adjusting the controller RF drive to the AOTF for optimizing optical power output from the AOTF. A range of RF frequencies is set to be applied to the AOTF acoustic transducer, which most generally can be from any lower frequency ($F_{low}$) to any higher frequency ($F_{high}$). The spectrum is divided ($F_{low}$ to $F_{high}$) into a sequence, for example of 1000 equal increments, or more generally "n" increments. The n+1 frequencies (sequence) are then sequentially applied (scanned) and the sensor output read for each point. A smaller scanning range is then selected by dividing the previous frequency spectrum span by some number (for example by 4). The center for this more narrow scan is selected as the frequency yielding the highest output (detected output) resulting from the previous scan just completed. Then the new sequence of RF signals is applied to the acoustic transducer 22, etc. This process is continued until the frequency spectrum span is less than 100 Hz or other selected value. The RF frequency yielding the largest AOTF output is then used as the center/base RF frequency for driving the acoustic transducer of the AOTF.

As a further embodiment, because the optimum RF frequency may change with time due to a variety of factors, such as temperature, at some pre-determined interval of time or event, a new scan can be initiated (block 64). The center RF frequency for this new scan can be the previously determined base RF frequency. The span of the frequencies is selected to be large, as done initially, to be certain that the span includes the best RF frequency. Each succeeding scan is then narrowed until a new base frequency is determined.

The controller can additionally be configured to provide output to a computer 42 (FIG. 1) for display of a chart/graph showing the optimum RF frequency 26 as a function of a desired wavelength output at 32. This data can be arrived at by systematically stepping the temperature, and for each temperature, performing the wavelength locker process as described in reference to FIG. 2.

In a further embodiment of the present invention, the controller senses an output of the AOTF sensor 38 and in response makes an adjustment of the RF frequency at 26 to optimize the output of 32. One embodiment of this feature requires a pre-calibration of the controller 10, for example by setting the AOTF sequentially at various temperatures, and determining the optimum RF signal frequency for a particular wavelength at each temperature. This data of RF frequency vs. temperature for each of a plurality of selected wavelengths, can be stored in an RF frequency correction data base 64 (FIG. 1). The process of using this data in operation of the system is illustrated in reference to FIG. 3. The controller begins by reading the AOTF sensor output (block 66). The controller then finds the closest sensor output data in the frequency correction data base (block 68). Alternatively, block 70 can be included, wherein the controller 10 stores a last/previous sensor data and compares the new data with the previous data. If the new data does not differ by more than a pre-set amount 72, the process skips to block 80 and the controller waits for a pre-set time interval or other event before repeating the process as indicated by line 32. If the new data does differ by at least the pre-set amount 74, then the controller finds the closest sensor output data in the frequency correction. data base (block 68) and selects the corresponding RF frequency data from the database to apply to the acoustic transducer (block 76). Then the controller outputs the RF frequency to the acoustic transducer (block 78). At this point, the controller can wait for an interval, such as a pre-set time period, or until the controller receives a command to repeat the process (block 80).

Figure 4:
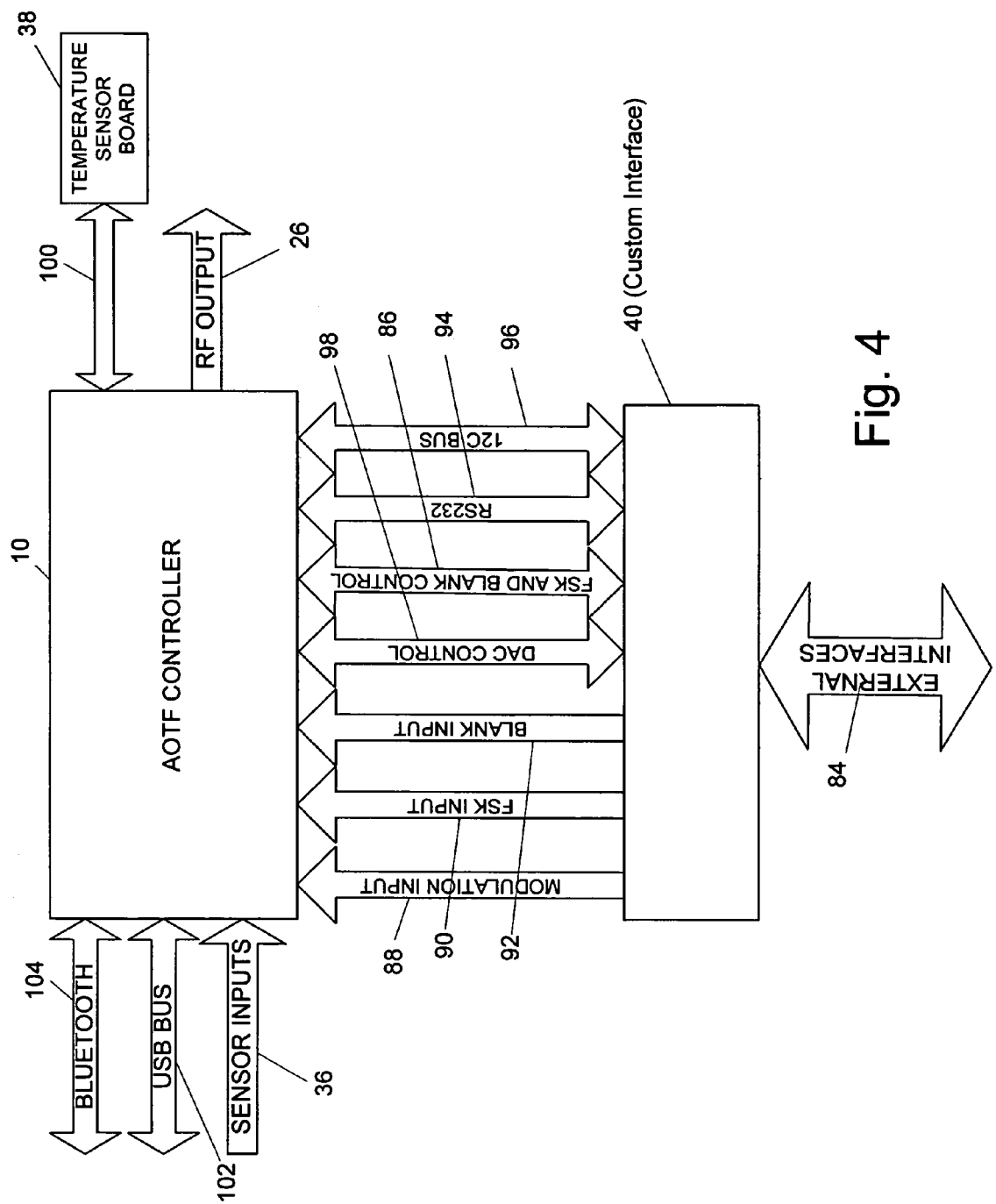
FIG. 4 is a block diagram for describing various inputs and outputs of the controller, and for describing a controller interface apparatus.

FIG. 4 illustrates various alternative communication features of the present invention, including the use of a custom interface apparatus 40 (FIG. 1). The interface 40 includes an input-output bus 84 for input of analog and/or digital modulation, for FSK (frequency shift keying) and blanking control inputs, and RS232 communications. A corresponding FSK and blanking communication bus 86 between the controller 10 and interface 40 is provided. The interface 40 may provide modulation 88, FSK 90 and blanking 92 inputs to the controller. RS232 and 12C buses 94 and 96 between the controller 10 and interface 40 are included, as well as a DAC bus 98. FIG. 4 also shows the AOTF sensor 38 and a bus 100 interconnected to the controller. Bus 26 provides the RF signal to the AOTF acoustic transducer 22. Sensor input bus 36 brings the wavelength detected signals to the controller. A USB bus 102 and blue tooth bus 104 are also provided. Further details concerning these features are described in U.S. Provisional, Patent application No. 60/585,248 file Jul. 1, 2004, the entire contents of which is included in the present disclosure by reference.

Figure 5:
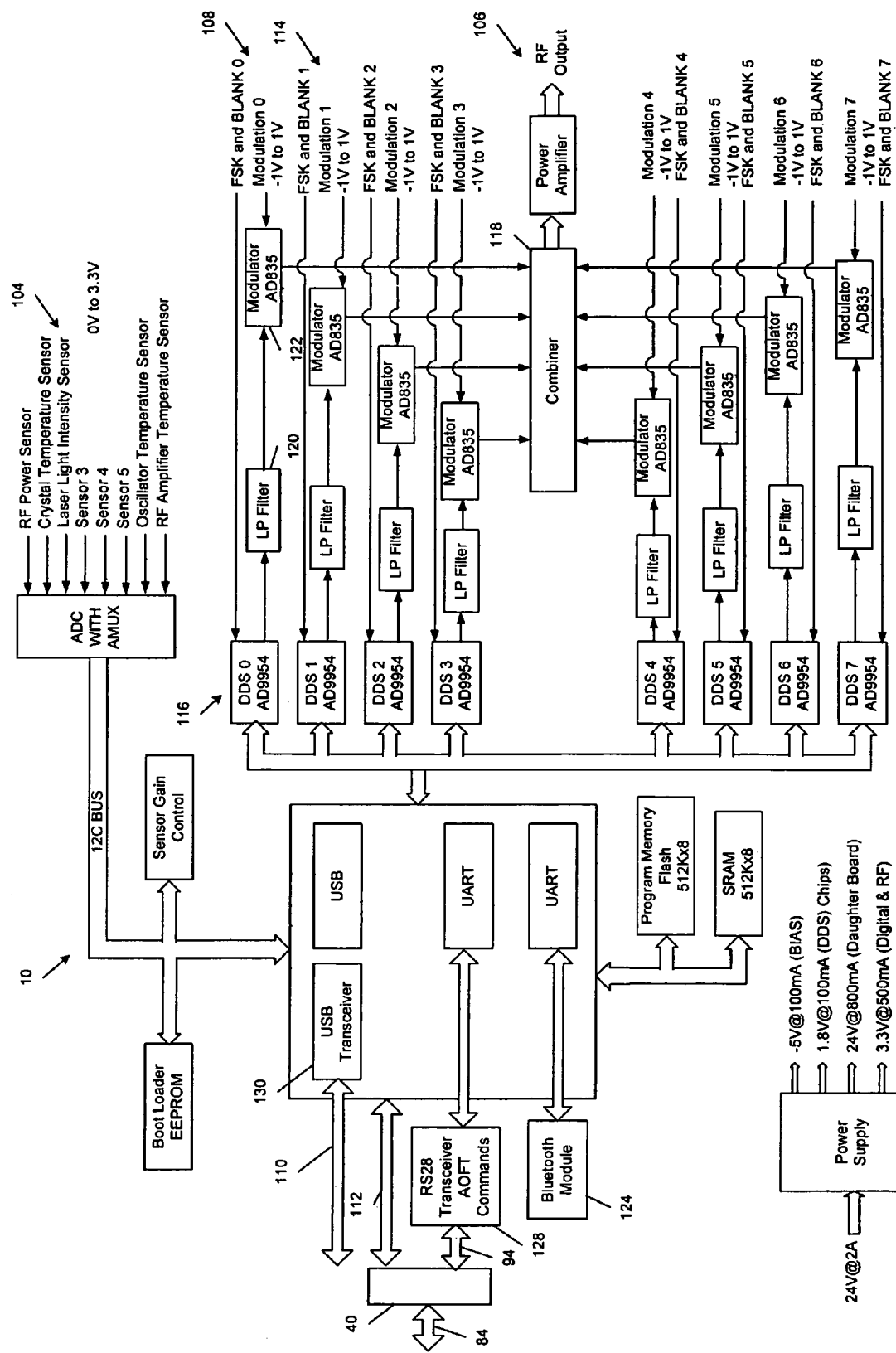
FIG. 5 is a more detailed block diagram of the controller and interface apparatus.

An embodiment of an acousto-optic-tunable filter (AOTF) controller 10 of the present invention is shown in more detail in FIG. 5. The controller 10 has a plurality of sensor inputs 104 for detecting signals representing any of various AOTF parameters, such as light output power, temperature, AOTF identification data, etc. The controller 10, in response to these detected signals, performs any of various functions. For example, in response to a detected AOTF output wavelength power, the controller 10 seeks to optimize the power output of the AOTF by adjusting a frequency of an RF drive signal from controller port 106 to an AOTF acoustic transducer 22 (FIG. 1). The AOTF 16 (FIG. 1) is placed in a control loop with the controller 10. The information fed back can be any of various parameters including for example optical intensity of a selected wavelength output from the AOTF, a temperature of the AOTF, and/or AOTF device parameter data stored in a EPROM in an AOTF housing, etc. . . . The controller 10 has modulation inputs 108 for application of data to each of one or more wavelengths passed by the AOTF 16.

A USB bus 110 is provided for input of controller programming data from a computer 42 (FIG. 1), and for output of monitoring performance data from the controller 10 to the computer 42. Alternate additional RS232 communication line 94 is shown. FSK and blanking inputs 114 are shown for switching a particular RF frequency for the purpose of selecting or de-selecting a particular wavelength, or selecting any one of a plurality of wavelengths through an AOTF. Other input types than FSK are also included in the present invention for this purpose, and also for the purpose of adjusting the amplitude of a selected wavelength.

Each DDS 116 operates to provide an RF signal to a combiner 118 for output to the AOTF. Filters 120 and modulators 122 are shown in line with each DDS 116 output to the combiner 118 for filtering out unwanted signals/noise and for modulating the signal.

FIG. 5 also shows a custom interface 40 as described in reference to FIG. 4, showing the RS232 bus 94 and a bus 112 including all other appropriate buses, such as those described in reference to FIG. 4. The interface 40 is provided with connectors selected to mate with a particular user's hardware, and has programmability for adopting input signals to conform to requirements of the controller.

FIG. 1D shows the daughter board 70 having input connectors 100 and 102, for example, where the choice of connectors 100 and 102 is specific to the requirements of the user. For example, an interface connector can mate with a specific user's connector for input of signals to the amplitude modulator input line 108 and frequency selection buses 126. Another connector could be for signals between a computer and a USB transceiver, or to the RS232 transceiver 94. All of these signals would be altered as required by the interface 40 and sent to the controller. An example of signal modification by the interface 40 would be to perform an A/D conversion for converting a user's analog input signal to a digital signal required by the amplitude modulator 122. The reverse D/A conversion could also be performed as required. In any situation, the interface 10 is custom configured to provide the proper adaptation from the user to the mother board/controller 10.

FIG. 5 shows alternate ways of controlling the DDS modules 116. A computer 42 can input signals via line 110 to the lines 108 and 114 (bus not shown), or it can input signals to the DDS 116 and modulator 122 via the bus 84 to the RS232 module 128, or it can send directions via bus 84 to bus 112 to the USB module 130 to a DDS module 116. FIG. 5 also shows a blue tooth module 124 providing a wireless connection for communication with the controller for providing inputs and receiving data.

Figure 6:
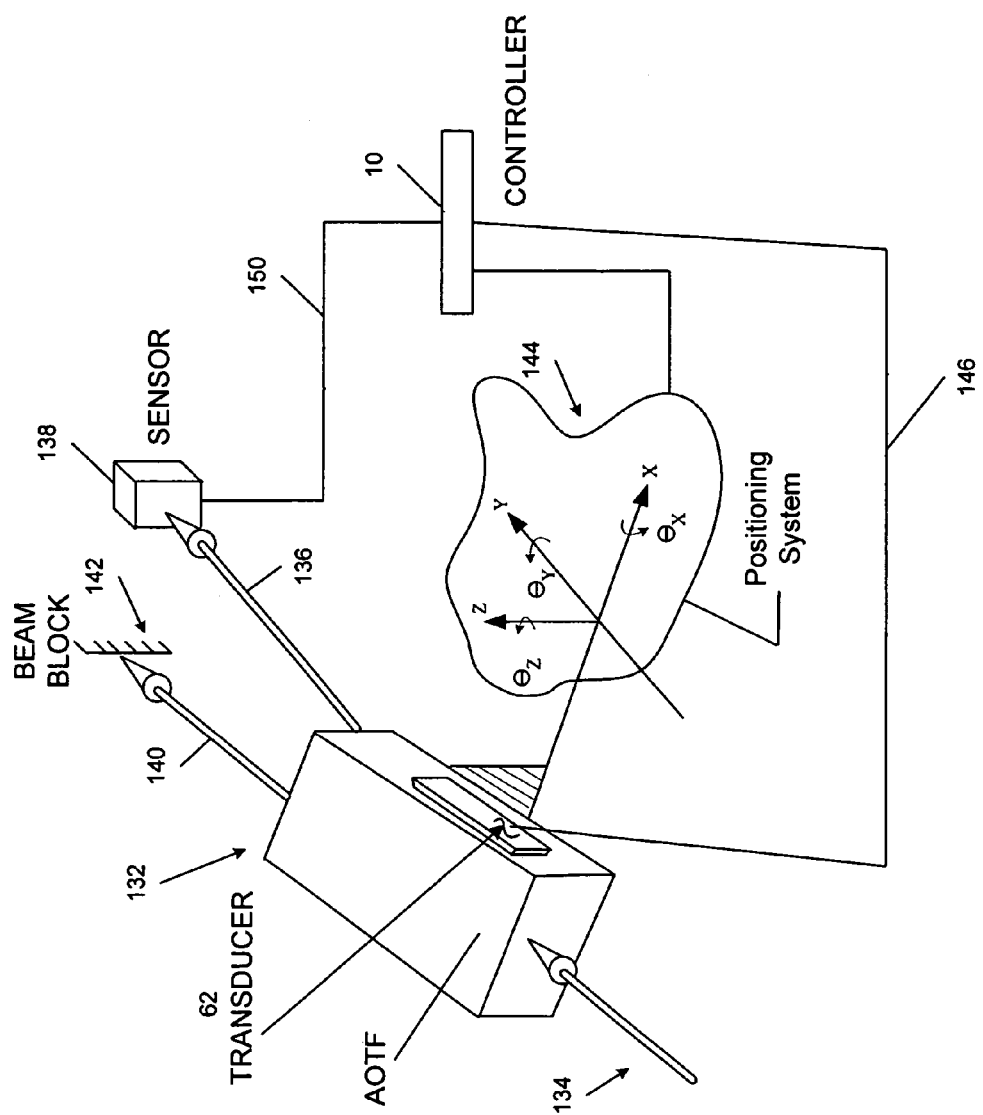
FIG. 6 illustrates use of a controller for maintaining an optimum position of an acousto-optic-tunable filter.

The controller 10 can also be used for other control functions, such as for controlling other mechanical and/or electrical functions. For example, the controller could direct and/or maintain an AOTF crystal physical orientation through electromechanical apparatus. A positioning system controlled by the controller is symbolically illustrated in FIG. 6. FIG. 6 illustrates an AOTF 132 upon which is incident a beam 134. FIG. 6 shows a refracted beam 136 impinging onto a sensor 138, and an un-refracted beam 140 onto a beam block 142. A positioning system 144 is symbolically illustrated for orienting/positioning the AOTF 132. The controller 10 is shown in communication with the positioning system 144, for positioning the AOTF, for example to adjust the beam 136 onto the sensor 138. The controller 10 outputs RF through line 146 to the acoustic transducer 148, and receives a detected/sensed signal through line 150 from the sensor 138. As discussed above, the AOTF can also have other sensors or data storage attached either directly as in an AOTF housing for providing useful input to the controller 10. The sketches of AOTFs in FIGS. 1 and 6 are simply given as symbolic representations of an AOTF. The present invention includes use of the controller 10 for controlling any controllable function of any kind of AOTF.

Although preferred embodiments of the present invention have been described above, it will be appreciated that certain modifications or alterations thereon will be apparent to those skilled in the art. It is therefore requested that the appended claims be interpreted as covering all such alterations and modifications that fall within the true spirit and scope of the invention.

What is claimed is:

1. A method for controlling an acousto-optic-tunable filter comprising:
 (a) controlling an acousto-optic-tunable filter with a controller, said controlling including determining an optimum RF signal for application to an acousto-optic-tunable filter acoustic transducer for selection of a particular light wavelength, including
  (i) scanning a sequence of RF signals defining a first frequency spectrum to said acoustic transducer;
  (ii) sensing a light out parameter from said acousto-optic-tunable filter corresponding to each of said RF signals;
  (iii) identifying a base frequency corresponding to a most optimum said output parameter and a corresponding RF frequency as a base RF frequency;
  (iv) selecting a next narrower frequency spectrum around said base RF frequency and selecting a corresponding next sequence of RF signals;

(v) scanning said next sequence of RF signals to said acoustic transducer; and (vi) repeating steps ii–v wherein each successive spectrum is more narrow than the previous spectrum until a minimum spectrum is reached, having a base RF frequency as an optimum base frequency to be applied to said acoustic transducer for selection of said particular light wavelength; and (b) custom interfacing said controller providing inputs to said controller, said interfacing including providing communication with a user's computer.

2. A method as recited in claim 1 wherein said interfacing further includes convening an input modulation signal to a differential analog amplitude modulation signal, for input to said controller for use by said controller in providing modulation of a light signal.

3. A method as recited in claim 1 wherein said interfacing further includes providing frequency shift keying (FSK) to said controller for use by said controller in switching a particular RF frequency for selecting or deselecting a particular light signal.

4. A method as recited in claim 1 wherein said interfacing further includes providing a blanking signal to said controller for use by said controller in selecting and deselecting a particular light signal.

5. A method as recited in claim 1 wherein said interfacing further includes providing an RS232interface to said controller.

6. A method as recited in claim 1 wherein said interfacing further includes providing a 12C bus interface with said controller.

7. A method as recited in claim 1 wherein said controlling further includes providing performance output data for display.

8. A method of controlling an acousto-optic-tunable filter comprising:

(a) controlling by a controller an acoustic-optic-tunable filter including
(i) scanning a sequence of a plurality of RF signals defining a frequency spectrum to an acoustic transducer of said acousto-optic-tunable filter;
(ii) monitoring an output power of each of a plurality of wavelengths output by said acousto-optic-tunable filter corresponding to said sequence of RF signals; and
(iii) selecting an RF signal frequency corresponding to an optimum output for a wavelength; and (b) custom interfacing said controller providing inputs to said controller, said interfacing including providing communication with a user's computer.

9. A method as recited in claim 8 wherein said controlling further includes:
(a) monitoring an acousto-optic-tunable filter parameter;
(b) reading an acousto-optic-tunable filter performance data stored in said controller indicating an optimum RF signal frequency for a monitored acousto-optic-tunable filter parameter; and
(c) setting said RF signal to said optimum RF frequency.

10. A method as recited in claim 8 wherein said controlling further includes:
outputting performance data for display on said user's computer monitor.

11. A method as recited in claim 8 wherein said controlling further includes:
modulating a parameter of a said wavelength.

12. An apparatus for controlling an acousto-optic-tunable filter comprising:

(a) a controller for controlling an acousto-optic-tunable filter including apparatus for determining an optimal RF signal for application to an acousto-optical-tunable filter acoustic transducer for selection of a particular light wavelength including
(i) apparatus for scanning a sequence of RF signals defining a first frequency spectrum to said acoustic transducer;
(ii) apparatus for sensing a light output parameter from said acousto-optic-tunable filter corresponding to each of said RF signals;
(iii) apparatus for identifying a base frequency corresponding to a most optimum said output parameter and a corresponding RF frequency as a base RF frequency;
(iv) apparatus for selecting a next narrower frequency spectrum around said RF base frequency and a corresponding next sequence of RF signals;
(v) apparatus for scanning said next sequence of RF signals to said acoustic transducer; and
(vi) apparatus for repeating steps ii-v wherein each successive spectrum is more narrow than a previous spectrum until a minimum spectrum is reached, having a base frequency as an optimum base frequency to be applied to said acoustic transducer for selection of said particular light wavelength; and (b) apparatus for custom interfacing said controller providing inputs to said controller, said interfacing including providing communication with a user's computer.

13. An apparatus as recited in claim 12 wherein said apparatus for interfacing further includes apparatus for converting an input/modulation signal to a differential analog amplitude modulation signal, for input to said controller for use by said controller in producing modulation of a light signal.

14. An apparatus as recited in claim 12 wherein said apparatus for interfacing further includes an apparatus providing frequency shift keying (FSK) to said controller for use by said controller in switching a particular RF frequency for selecting or deselecting a particular light signal.

15. An apparatus as recited in claim 12 wherein said apparatus for interfacing further includes apparatus for providing a blanking signal to said controller for use by said controller in selecting and deselecting a particular light signal.

16. An apparatus as recited in claim 12 wherein said apparatus for interfacing further includes apparatus for providing an RS232interface to said controller.

17. An apparatus as recited in claim 12 wherein said apparatus for interfacing further includes apparatus for providing a 12C bus interface with said controller.

18. An apparatus as recited in claim 12 wherein said apparatus for controlling further includes apparatus for providing performance output data for display.

* * * * *